(12) United States Patent
Kok et al.

(10) Patent No.: US 11,316,576 B2
(45) Date of Patent: Apr. 26, 2022

(54) WIRELESS COMMUNICATION SYSTEM AND A PRECODER DEVICE FOR USE IN SUCH SYSTEM

(71) Applicant: City University of Hong Kong, Kowloon (HK)

(72) Inventors: Chi Wah Kok, Kowloon (HK); Wing Shan Tam, Fanling (HK); Wai Ming Chan, Mei Foo Sun Chuen (HK); Hing Cheung So, Kowloon (HK)

(73) Assignee: City University of Hong Kong, Kowloon (HK)

(*) Notice: Subject to any disclaimer, the term of this patent is extended or adjusted under 35 U.S.C. 154(b) by 0 days.

(21) Appl. No.: 16/668,137

(22) Filed: Oct. 30, 2019

(65) Prior Publication Data
US 2021/0135731 A1 May 6, 2021

(51) Int. Cl.
*H04B 7/06* (2006.01)
*H04L 25/03* (2006.01)

(52) U.S. Cl.
CPC ..... *H04B 7/0671* (2013.01); *H04L 25/03343* (2013.01)

(58) Field of Classification Search
CPC ...... H04B 7/0671; H04B 7/06; H04B 7/0667; H04B 7/0413; H04L 25/03343; H04L 25/03006
See application file for complete search history.

(56) References Cited

U.S. PATENT DOCUMENTS

| 7,924,958 B2* | 4/2011 | Hwang | H04L 25/03343 375/349 |
| 9,948,373 B2* | 4/2018 | Cassiau | H04L 27/264 |

OTHER PUBLICATIONS

A. Alkhateeb and R. W. Heath, "Frequency selective hybrid precoding for limited feedback millimeter wave systems" IEEE Transactions on Communications, vol. 64, No. 5, pp. 1801-1818, May 2016.
Y. Kabalci and H. Arslan, "Hybrid precoding for mmWave massive MIMO systems with generalized triangular decomposition," in 2018 IEEE 19th Wireless and Microwave Technology Conference (WAMICON), Sand Key, FL, USA, Apr. 2018, pp. 1-6.
J. Mo, et al, "Hybrid architectures with few-bit ADC receivers: Achievable rates and energy-rate tradeoffs," IEEE Transactions on Wireless Communications, vol. 16, No. 4, pp. 2274-2287, Apr. 2017.
W. M. Chan, et al, "Delay-line precoder based analog-digital MIMO systems with MMSE equalizer," in 2018 IEEE Global Conference on Signal and Information Processing, Anaheim, CA, USA, 2018, pp. 1262-1265.
M. W. Kwan and C. W. Kok, "MMSE equalizer for MIMO-ISI channel with shorten guard period," IEEE Transactions on Signal Processing, vol. 55, No. 1, pp. 389-395, Jan. 2007.

* cited by examiner

*Primary Examiner* — Betsy Deppe
(74) *Attorney, Agent, or Firm* — Renner Kenner Greive Bobak Taylor & Weber

(57) ABSTRACT

A wireless communication system and a precoder device for use in such system. The precoder device includes a delay element arranged to introduce a delay to a plurality of sub-channels of a signal at a transmitter end of the communication system; wherein the delay in a plurality of sub-channels are associated with a process time of a receiver component at a receiver end of the communication system.

25 Claims, 4 Drawing Sheets

WIRELESS COMMUNICATION SYSTEM AND A PRECODER DEVICE FOR USE IN SUCH SYSTEM

TECHNICAL FIELD

The present invention relates to a wireless communication system and a precoder device tor use in such system, and particularly, although not exclusively, to an analogue precoder device.

BACKGROUND

Electronic data may fee transmitted using a communication network, such as a wire or a wireless network. For example, when a mobile client device downloads data packets from a remote server, the data packets may be transmitted through wired network, in form of bits of voltage logic, from the remote server to a base station in a cellular network, and then wirelessly transmitted to the mobile device in form of electromagnetic signals.

Beside conversion of form of signals which may occur, when data are transmitted from a source device to a destination device through different network means, data may also be converted between analogue and digital formats. For example, digital bits may be modulated into analogue signals which may be more easily transmitted in wireless network, however, the analogue signals are to be further converted back to digital form when reaching the receiver end for further processing.

SUMMARY OF THE INVENTION

In accordance with a first aspect of the present invention, there is provided a precoder device for a communication system, comprising: a delay element arranged to introduce a delay to a plurality of sub-channels of a signal at a transmitter end of the communication system; wherein the delay in a plurality of sub-channels are associated with a process time of a receiver component at a receiver end of the communication system.

In an embodiment of the first aspect, the incremental time delay includes a predetermined time difference between adjacent sub-channels.

In an embodiment of the first aspect, the incremental time delay includes a constant time difference between adjacent sub-channels.

In an embodiment of the first aspect, the process time includes a time period defined by a symbol rate at the receiver end.

In an embodiment of the first aspect, the process time includes a sampling time period of an analogue-to-digital converter (ADC) at the receiver end.

In an embodiment of the first aspect, the precoder device is a trailing-zero analogue precoder.

In an embodiment of the first aspect, the precoder device further comprises a universal precoder and a plurality of analogue permutation switches both arranged to process each of the plurality of sub-channels in the signal at the transmitter end.

In an embodiment of the first aspect, the precoder is represented as: $G(z)=M \cdot C \cdot U(z)$, wherein: $U(z)$ is a linear precoding matrix with dimensions of K×K, where K denotes a total number of sub-channels of the signal; C is a rectangular matrix with dimensions of P×K, where P denotes a sample rate of sub-channel analogue signals; and M is a square permutation matrix with dimensions of P×P.

In an embodiment of the first aspect, C is a constant matrix has a form of $$C = \begin{bmatrix} I_K \\ A \end{bmatrix},$$

wherein A is a (P−K)×K arbitrary matrix with a predetermines component value.

In an embodiment of the first aspect, the precoder device is an arbitrary linear precoder.

In an embodiment of the first aspect, the delay element includes an analogue delay element.

In an embodiment of the first aspect, the analogue delay element includes an analogue delay-line.

In an embodiment of the first aspect, the analogue delay-line includes a plurality of printed circuit board traces connected with each or the sub-channels.

In an embodiment of the first aspect, the analogue delay-line includes a plurality of signal traces on dielectric material connected with each of the sub-channels.

In an embodiment of the first aspect, the delay element is provided in the output stage of the transmitter end.

In accordance with a second aspect of the present invention, there is provided a wireless communication system comprising a wireless signal transmitter having a precoder device and a wireless signal receiver, wherein the precoder device comprises: a delay element arranged to introduce a delay to a plurality of sub-channels of a signal at the wireless signal transmitter; wherein the delay in a plurality of sub-channels are associated with a process time of a receiver component at the wireless signal receiver.

In an embodiment of the second aspect, the incremental time delay includes a predetermined time difference between adjacent sub-channels.

In an embodiment of the second aspect, the incremental time delay includes a constant time difference between adjacent sub-channels.

In an embodiment of the second aspect, the process time includes a time period defined by a symbol rate at the wireless signal receiver.

In an embodiment of the second aspect, the process time includes a sampling time period of an analogue-to-digital converter (ADC) at the wireless signal receiver.

In an embodiment of the second aspect, the precoder device is a trailing-zero analogue precoder.

In an embodiment of the second aspect, the precoder device further comprising a universal precoder and a plurality of analogue permutation switches both arranged to process each of the plurality of sub-channels in the signal at the wireless signal transmitter.

In an embodiment of the second aspect, the precoder device is an arbitrary linear precoder.

In an embodiment of the second aspect, the delay element includes an analogue delay element.

In an embodiment of the second aspect, the analogue delay element includes an analogue delay-line.

In an embodiment of the second aspect, the analogue delay-line includes a plurality of printed circuit board traces connected with each of the sub-channels.

In an embodiment of the second aspect, the analogue delay-line includes a plurality of signal traces on dielectric material connected with each of the sub-channels.

In an embodiment of the second aspect, the delay element is provided in the output stage of the transmitter end.

In an embodiment of the second aspect, the wireless signal transmitter includes a plurality of transmission antennas at the output stage.

In an embodiment of the second aspect, the wireless signal receiver comprises a plurality of receive antennas and a plurality of digital equalizers.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that linear precoder equalizer system may be used in communications to combat inter-symbol interference (ISI) (for wired, wireless, optical, magnetic, and other transmission medium). However, some example linear precoders may be of high complexity which hinders the applicability of linear precoding in transmitters.

Figure 1:
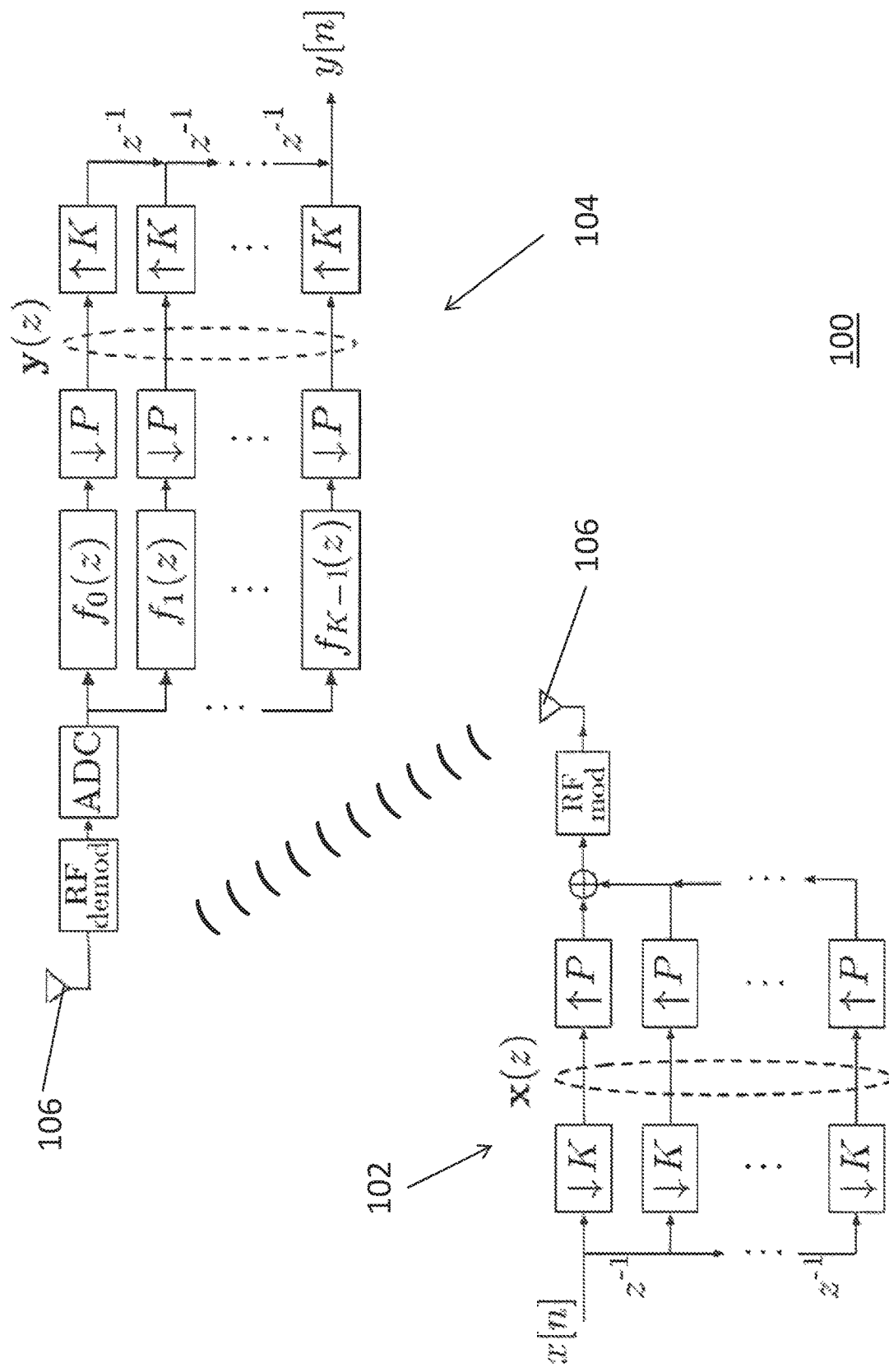
FIG. 1 is a block diagram showing a wireless communication system in accordance with an embodiment of the present invention.

With reference to FIG. 1, there is shown an example embodiment of a wireless communication system 100, comprising a wireless signal transmitter 202 and a wireless signal receiver 104. In addition, the transmitter end is further provided with a digital precoder equalizer for processing the signal before transmitting it to the receiver end through one or more antennas. In some applications, multiple antennas on both transmitter and receiver ends may be used in communication signals using multiple bands or a plurality of sub-channels, and the signals may be transmitted in form of electromagnetic signals, such as radio frequency (RF) signals.

In this example, the input signal is x[n], and is further converted to a vector x(z) of length K by blocking (sampling the digital delayed signal), such that $x(z)=[x_0(z), x_1(z), \ldots, x_{K-1}(z)]^T$. The sub-channel $x_k(z)$ with $k \in [0, K-1]$ is up-converted (through zero padding) to form part of the transmission signal with rate P. The final transmission signal is the sum of all the up-sampled sub-channel signals, which will be radio frequency (RF) modulated and sent to the communication channel (which car, be wired, wireless, optical, magnetically, or any other medium). Preferably, the lit signal may be transmitted from the transmitter, end to the receiver ends via RF antennas 106 at respective ends.

On the receiver side 104, upon receiving a signal from the transmitter 102, the received signal is first frequency demodulated to obtain the baseband signal. A single analog-to-digital converter (ADC) may be used to convert the received signal sequence to a digital signal sequence.

In this example, the digital signal may convolute with K equalizers $f_k(z)$, with $k \in [0, K-1]$, and generate K sub-channel signals. These K sub-channel signals may be combined together by removing the redundancy from the transmit signal sequence through down- and up-sampling, and the sampled sub-channel sequences are combined together to produce the decoded signal sequence y[n].

Figure 2:
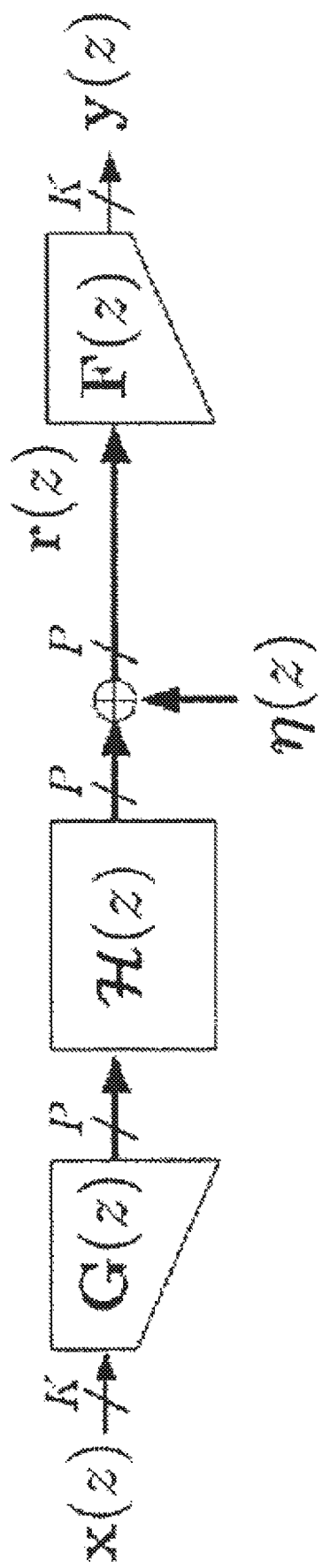
FIG. 2 is a block diagram showing an equivalent system of a trailing-zero precoder-equalizer communication system.

With reference to FIG. 2, the operation of the communication system may be further explained using the polyphase representation. In this example, let the wireless channel response with $L_H$-th order be $$h(z)=\Sigma_{n=0}^{L_H}h[n]z^{-1} \quad (1)$$

where h[n] is the n-th channel tap. The input signal block x[n] is up-sampled by P through the precoder $$G(z) = \begin{bmatrix} g_{0,0}(z) & \cdots & g_{0,K-1}(z) \\ \vdots & \ddots & \vdots \\ g_{P-1,0}(z) & \cdots & g_{P-1,K-1}(z) \end{bmatrix} \quad (2)$$

where $g_{p,k}(z)$ denotes the p-th polyphase component of the k-th filter $g_k(z)$ and $L_G$ denotes the order of the precoder G(z). The received signal block will be processed by the equalizer $f_k(z)$ In polyphase representation giver, by $$F(z) = \begin{bmatrix} f_{0,0}(z) & \cdots & f_{0,P-1}(z) \\ \vdots & \ddots & \vdots \\ f_{K-1,0}(z) & \cdots & f_{K-1,P-1}(z) \end{bmatrix} \quad (3)$$

where $f_{k,p}(z)$ denotes the p-th polyphase component of the k-th filter $f_k(z)$ and $L_r$ denotes the order of the equalizer F(z).

Similarly, the block filter matrix H(z) is the equivalent finite impulse response (FIR) channel h(z) in (1) for the polyphase representation of the precoder and equalizer system, referring to FIG. 2.

$$H(z) = \begin{bmatrix} h_0(z) & z^{-1}h_{P-1}(z) & \cdots & z^{-1}h_1(z) \\ h_1(z) & h_0(z) & \cdots & z^{-1}h_1(z) \\ \vdots & \vdots & \ddots & \vdots \\ h_{P-2}(z) & h_{P-3}(z) & \cdots & z^{-1}h_{P-1}(z) \\ h_{P-1}(z) & h_{P-2}(z) & \vdots & h_0(z) \end{bmatrix} \quad (4)$$

Note that H(z) with $L_H$ being the order of the block channel matrix, and $h_p(z)$ denotes the p-th polyphase component of $h(z)=\Sigma_{n=0}^{L_H}h[n]z^{-n}$. As a result, the transfer function between the input signal block x(z) and the equalizer signal block y(z) can be written as $$y(z)=F(z)H(z)G(z)x(z)+F(z)\eta(z) \quad (5)$$

where η is the additive channel noise vector with P polyphases, and x(z) and y(z) are shown in FIG. 1.

Figure 3:
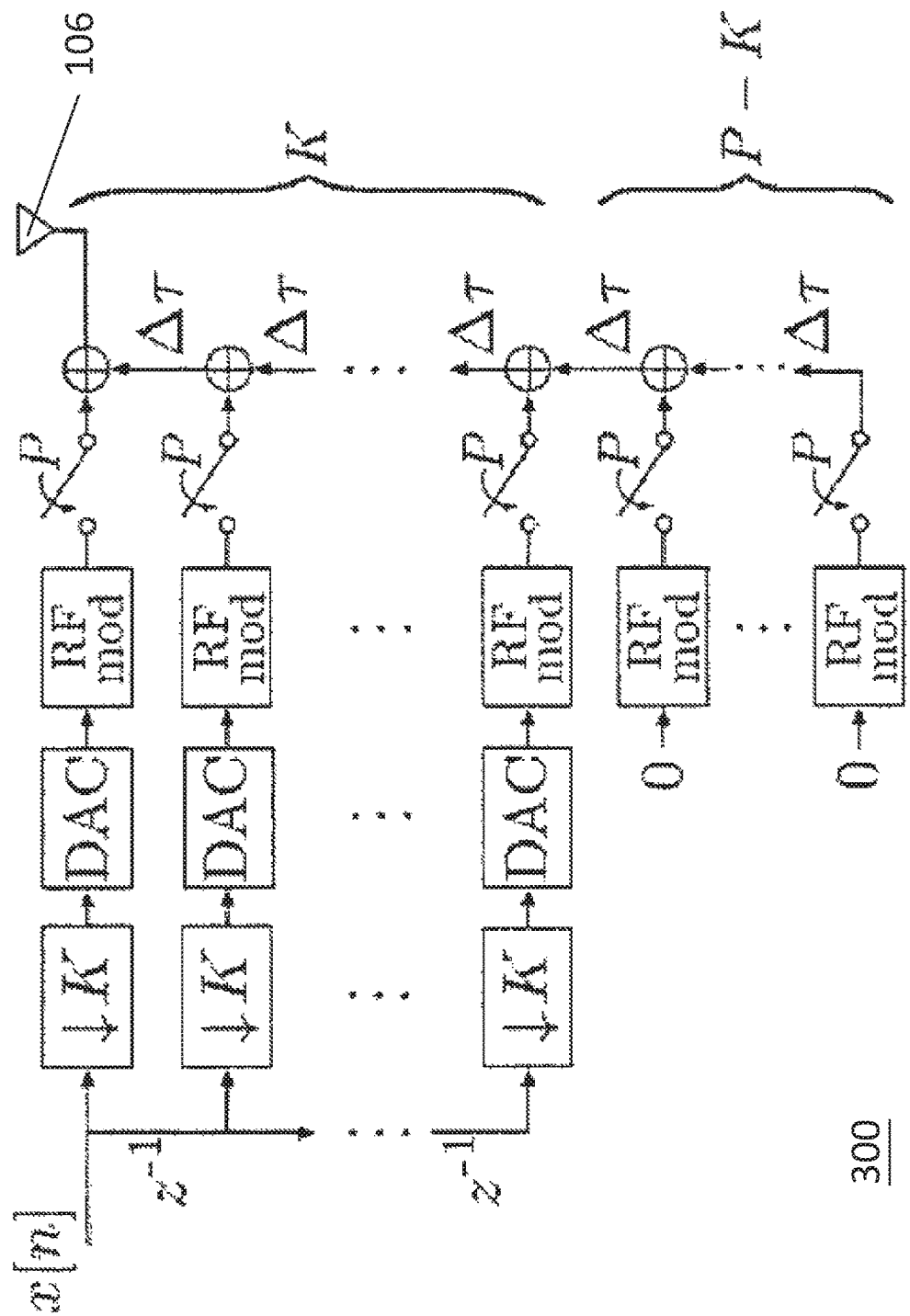
FIG. 3 is a block diagram showing an example transmitter including a trailing-zero analogue precoder in accordance with an embodiment of the present invention.

With reference to FIG. 3, there is shown an example embodiment of a precoder device 300 for a communication system, which may operate as a delay-line analogue precedes. The operation of this precoder device is equivalent to a trailing-zero digital precoder. In this example, the precoder device comprises a delay element arranged to introduce a delay to a plurality of sub-channels of a signal at a transmitter end of the communication system; wherein the delay in a plurality of sub-channels are associated with a process time of a receiver component at a receiver end of the communication system.

In this embodiment, different delays are introduced to each of the sub-channels at the transmitter end such that each of the sub-channel signals may be properly processed without a need oil temporary storing the received signal upon the signal reaches the receiver end. Such delay period is closely relevant to the process time of the receiver. For example, the process time may include a sampling time period of an analogue-to-digital converter (ADC) at the receiver end, which also defines the symbol rate of the wireless signal receiver.

Preferably, the modulated signal in each of the sub-channels will be passed to the antenna through the switches and the delay components in each of the individual channels. By introducing a delay component between the switches and the antenna, the sub-channel signals reach the antenna and therefore are placed in a transmission queue according to the different delay periods placed in the output stage in each channel.

At the receiver end, the ADC processes the received signals including multiple sub-channel components, one at a time, and according to the order of the components in the aforementioned queue, with a substantially constant processing time. Preferably, each of the sub-channel signals at the transmitter end is introduced with an incremental time delay with a predetermined time difference between adjacent sub-channels, such that the multiple sub-channels may be processed one at a time, and the incremental delays may ensure that the next sub-channel signal does not reach the receiver end when the previous one is still under processing by the ADC. In some embodiments, the time difference between the sub-channels may be constant.

Alternatively, the incremental delay time $\Delta\tau$ may match with other components in the receiver system at an early stage in the receiver.

With reference to FIG. 3, the delay $\Delta\tau$ is adjusted to be the same as the sampling time period of the ADC (the symbol rate) in the receiver. The precoder g(z) in z-transformer domain will be equivalent to:

$$g(z)=[1\, z^{-1}\, \ldots\, z^{-K+1}] \quad (6)$$

Furthermore, the polyphaser delay-line precoder matrix G(z) in (2) will become:

$$G(z) = \begin{bmatrix} I_K \\ O_{(P-K)\times K} \end{bmatrix} \quad (7)$$

with P≥K, where $I_K$ is the identity matrix with size K×K, and $O_{(P-k)\times k}$ is a zero matrix with size (P−K)×K.

Preferably, the precoder-equalizer system is said to be zero-forcing, when it satisfies $$F(z)H(z)G(z)=z^{-L_d}I_K \quad (8)$$

in the absence of channel noise, where $L_d$ is the system delay or the precoder-equalizer communication system.

Preferably, the delay element includes an analogue delay element, such as but not limited to an analogue delay-line built with printed circuit board traces connected with each of the sub-channels. As appreciated by a skilled person, electrical conductors such as traces defined on a PCB introduces propagation delay to a signal to be transmitted between components, and the delay time is based on the length of the trace as the signal has to propagate a longer distance if the PCB trace is longer.

Alternatively, other analogue delay components or modules may be used to create such delays in each of the sub-channel components of the transmitted signal.

In one example embodiment, a low-complexity precoder may be constructed with an analogue delay-line. Preferably, the precoder does not require high speed memory to store the blocking signal, nor an analogue-to-digital convertor (ADC) and memory module to operate at the same rate of the transmit symbol rate.

Preferably, the sub-channel analogue signals may be sampled at rate P before feeding into the analogue delay-line with constant time delay $\Delta\tau$ per adjacent sub-channel. In addition, the delay element may be provided in the output stage of the transmitter end, i.e. just before the signal is transmitted using the antenna(s) in the transmitter.

Figure 4:
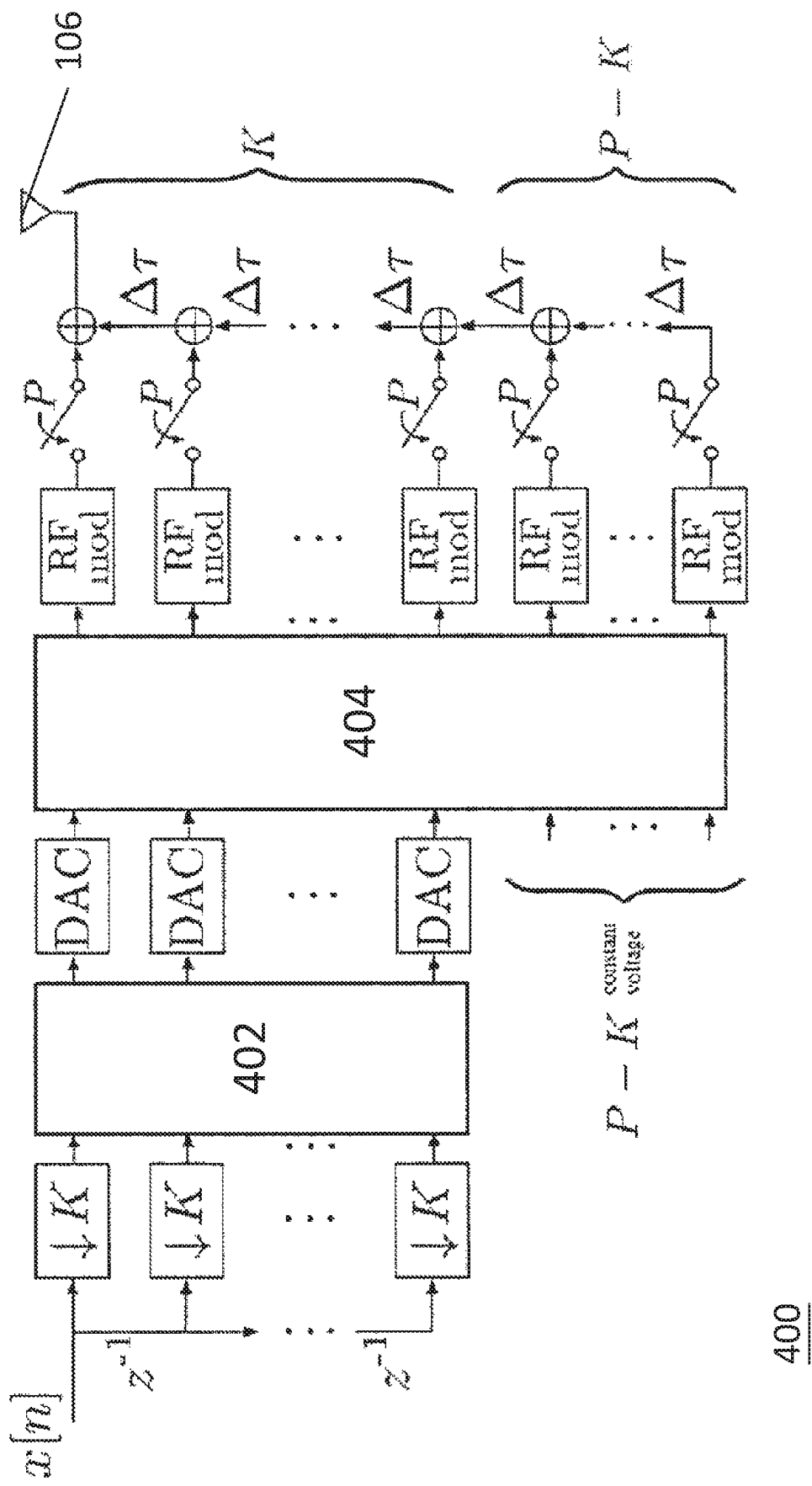
FIG. 4 is a block diagram showing an example transmitter including a universal precoder in accordance with an embodiment of the present invention.

With reference to FIG. 4, there is shown an alternative embodiment of a precoder device 400. In this embodiment, the precoder device is a delay-line analogue precoder which operates as an arbitrary digital linear precoder.

In this example, the precoder device 400 further comprises a universal precoder 402 and a plurality of analog permutation switches 404 both arranged to process each of the plurality of sub-channels in the signal at the transmitter end.

In an example digital implementation, the universal digital precoder may be separated into two parts, a universal precoder U(z) and a permutation matrix M. In other words, an arbitrary linear precoder in (2) may be factorized into the following matrix product $$G(z)=M\cdot C\cdot U(z) \quad (9)$$

wherein U(z) s a linear precoding matrix with dimensions of K×K, where K denotes a total number of sub-channels of the signal; C is a rectangular matrix with dimensions of P×K, where P denotes a sample cate of sub-channel analogue signals; and M is a square permutation matrix with dimensions of P×P.

In addition, C is a constant matrix in a form of $$C = \begin{bmatrix} I_K \\ A \end{bmatrix} \quad (10)$$

wherein A is a (P−K)×K arbitrary matrix with a predetermined component value. As an example, for trailing-zero analogue delay-line precoder, A may be a zero matrix of dimensions (P−K)×K, and where $I_K$ is the identity matrix with size K×K.

Similar to the previous example, the delays may be introduced in each of the sub-channels just before the signals are transmitted out by the antenna 106.

These precoder devices may be used in multi-channel wireless communication systems, which include one or more wireless signal transmitters and receivers. Each of these devices at both ends may be provided with multiple antennas such that the multiple wireless signals and/or signal with multiple sub-channels may be communicated therebetween.

In one example, the wireless signal transmitter may include a plurality of transmission antennas at the output stage, and the wireless signal receiver may comprise a plurality of receive antennas and a plurality of digital equalizers.

These embodiments may be advantageous in that analogue preceding only requires the use of relatively simple analogue delay components, such as delay-lines. The system has the advantage of low hardware complexity and does not require, the use of large memory module to construct the analogue precoder when compared with other example preceding systems. In addition, the system may perform with higher energy efficiency while maintaining the same communication efficiency, simply by using analogue precoder with analogue delay components in precoder-equalizer communication systems.

Advantageously, the analogue precoder device maxes use of an analogue delay-line or other simple analogue delay modules to alleviate the problem in the design and implementation of analogue precedes, and eliminate the use of high frequency analogue-to-digital converter (ADC) or nor large memory module in the receiver end.

In addition, the analogue delay-line based precoder ray be provided to mimic a digital trailing-zero precoder and transmission redundancy is injected to the transmit signal block by zero padding to combat the ISI channel. The same digital equalizer may be used in trailing-zero digital precoder-equalizer system, and may be applied to reconstruct the transmitted signal from the analogue delay-line trailing-zero precoder.

Advantageously, the ISI problem may also be alleviated when the precoder block size $P > L_H$ with at least one redundancy signal. For example, the injected redundancy may be zeros as in the case of trailing-zero precedes, the redundancy may be injected into the transmit signal block by the precoder, where $L_H$ is the order of the wireless ISI channel.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior, art contained herein is not to be taken as an admission that the information is common general knowledge, unless otherwise indicated.

The invention claimed is:

1. A precoder device for a communication system, comprising:
   a delay element arranged to introduce a different delay to each sub-channel in a plurality of sub-channels of a signal at a transmitter end of the communication system, wherein the plurality of sub-channels are arranged in parallel;
   a universal precoder and a plurality of analogue permutation switches both arranged to serially process each of the plurality of sub-channels in the signal at the transmitter end;
   wherein each different delay in the plurality of sub-channels is associated with a process time of a receiver component at a receiver end of the communication system; and
   wherein the delay element is provided in the output stage of the transmitter end, such that the signal in each of the sub-channels is passed to an antenna through the delay element.

2. The precoder device in accordance with claim 1, wherein said each different delay in the plurality of sub-channels includes a time delay.

3. The precoder device in accordance with claim 2, wherein the time delay includes a predetermined time difference between adjacent sub-channels.

4. The precoder device in accordance with claim 1, wherein the process time includes a time period defined by a symbol rate at the receiver end.

5. The precoder device in accordance with claim 4, wherein the process time includes a sampling time period of an analogue-to-digital converter (ADC) at the receiver end.

6. The precoder device in accordance with claim 5, wherein the precoder device is a trailing-zero analogue precoder.

7. The precoder device in accordance with claim 1, wherein the precoder device is represented as:

$G(z) = M \cdot C \cdot U(z)$, wherein:

U(z) is a linear precoding matrix, representing the universal precoder, with dimensions of K×K, where K denotes a total number of sub-channels of the signal;

C is a rectangular matrix with dimensions of P×K, where P denotes a sample rate of sub-channel analogue signals; and M is a square permutation matrix, representing the plurality of analogue permutation switches, with dimensions of P×P.

8. The precoder device in accordance with claim 7, wherein C is a constant matrix has a form of $$C = \begin{bmatrix} I_K \\ A \end{bmatrix},$$

wherein A is a (P−K)×K arbitrary matrix with a predetermined component value, and $I_K$ is an identity matrix of size K×K.

9. The precoder device in accordance with claim 1, wherein the precoder device is an arbitrary linear precoder.

10. The precoder device in accordance with claim 1, wherein the delay element includes an analogue delay element.

11. The precoder device in accordance with claim 10, wherein the analogue delay element includes an analogue delay-line.

12. The precoder device in accordance with claim 11, wherein the analogue delay-line includes a plurality of printed circuit board traces connected with each of the sub-channels.

13. The precoder device in accordance with claim 11, wherein the analogue delay-line includes a plurality of signal traces on dielectric material connected with each of the sub-channels.

14. A wireless communication system comprising a wireless signal transmitter having a precoder device and a wireless signal receiver, wherein the precoder device comprises:
   a delay element arranged to introduce a different delay to each sub-channel in a plurality of sub-channels of a signal at the wireless signal transmitter, wherein the plurality of sub-channels are arranged in parallel;
   a universal precoder and a plurality of analogue permutation switches both arranged to serially process each of the plurality of sub-channels in the signal at a transmitter end;
   wherein each different delay in the plurality of sub-channels is associated with a process time of a receiver component at the wireless signal receiver; and
   wherein the delay element is provided in the output stage of the transmitter end, such that the signal in each of the sub-channels is passed to an antenna through the delay element.

15. The wireless communication system in accordance with claim 14, wherein said each different delay in the plurality of sub-channels includes a time delay.

16. The wireless communication system in accordance with claim 15, wherein the time delay includes a predetermined time difference between adjacent sub-channels.

17. The wireless communication system in accordance with claim 14, wherein the process time includes a time period defined by a symbol rate at the wireless signal receiver.

18. The wireless communication system in accordance with claim 17, wherein the process time includes a sampling time period of an analogue-to-digital converter (ADC) at the wireless signal receiver.

19. The wireless communication system in accordance with claim 18, wherein the precoder device is a trailing-zero analogue precoder.

20. The wireless communication system in accordance with claim 14, wherein the precoder device is an arbitrary linear precoder.

21. The wireless communication system in accordance with claim 14, wherein the delay element includes an analogue delay element.

22. The wireless communication system in accordance with claim 21, wherein the analogue delay element includes an analogue delay-line.

23. The wireless communication system in accordance with claim 22, wherein the analogue delay-line includes a plurality of printed circuit board traces connected with each of the sub-channels.

24. The wireless communication system in accordance with claim 22, wherein the analogue delay-line includes a plurality of signal traces on dielectric material connected with each of the sub-channels.

25. The wireless communication system in accordance with claim 14, wherein the wireless signal receiver comprises a receive antenna and a plurality of digital equalizers.

\* \* \* \* \*